US012284366B2

(12) United States Patent
Cui

(10) Patent No.: US 12,284,366 B2
(45) Date of Patent: Apr. 22, 2025

(54) METHOD FOR CODING A VIDEO BASED ON A LONG-TERM REFERENCE FRAME, DEVICE, AND STORAGE MEDIUM

(71) Applicant: BIGO TECHNOLOGY PTE. LTD., Singapore (SG)

(72) Inventor: Tongbing Cui, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 261 days.

(21) Appl. No.: 17/996,768

(22) PCT Filed: Apr. 21, 2021

(86) PCT No.: PCT/CN2021/088586
§ 371 (c)(1),
(2) Date: Oct. 20, 2022

(87) PCT Pub. No.: WO2021/213418
PCT Pub. Date: Oct. 28, 2021

(65) Prior Publication Data
US 2023/0171410 A1 Jun. 1, 2023

(30) Foreign Application Priority Data
Apr. 21, 2020 (CN) .......................... 202010318681.1

(51) Int. Cl.
H04N 19/159 (2014.01)
H04N 19/176 (2014.01)

(52) U.S. Cl.
CPC ......... H04N 19/159 (2014.11); H04N 19/176 (2014.11)

(58) Field of Classification Search
None
See application file for complete search history.

(56) References Cited

U.S. PATENT DOCUMENTS

| 8,494,049 B2 | 7/2013 | Buttimer et al. |
| 8,532,182 B2 * | 9/2013 | Koo ...................... H04N 19/174 375/240.12 |
| 8,532,184 B2 * | 9/2013 | Koo ...................... H04N 19/573 375/240.12 |
| 8,761,255 B2 * | 6/2014 | Koo ...................... H04N 19/70 375/240.12 |

(Continued)

FOREIGN PATENT DOCUMENTS

| CN | 104081779 A | 10/2014 |
| CN | 105898296 A | 8/2016 |

(Continued)

OTHER PUBLICATIONS

International Search Report of the International Searching Authority for State Intellectual Property Office of the People's Republic of China in PCT application No. PCT//CN2021/088586 issued on Jul. 21, 2021, which is an international application to which this application claims priority.

(Continued)

Primary Examiner — Mohammad J Rahman
(74) Attorney, Agent, or Firm — Kolitch Romano Dascenzo Gates LLC

(57) ABSTRACT

Disclosed is a method for coding a video based on a long-term reference frame. The method includes: setting a long-term reference frame according to attribute information of an image frame; determining a reference index of a to-be-coded image frame based on a normal reference frame and the long-term reference frame; and acquiring a target matching block by performing inter prediction based on the reference index, so as to achieve coding of the to-be-coded image frame; wherein setting the long-term reference frame according to the attribute information of the image frame includes: setting the long-term reference frame based on a degree of redundancy in a time domain and a degree of redundancy in a spatial domain of the image frame.

20 Claims, 5 Drawing Sheets

(56) References Cited

U.S. PATENT DOCUMENTS

| | | | |
|---|---|---|---|
| 8,861,598 B2 | 10/2014 | Mauchly et al. | |
| 9,479,776 B2 | 10/2016 | Wang et al. | |
| 9,674,542 B2 | 6/2017 | Chen et al. | |
| 2007/0206673 A1* | 9/2007 | Cipolli | H04N 19/573 375/240.1 |
| 2009/0033745 A1* | 2/2009 | Yeredor | G08B 13/19608 348/152 |
| 2009/0238278 A1 | 9/2009 | Mauchly et al. | |
| 2010/0086030 A1 | 4/2010 | Chen et al. | |
| 2013/0223524 A1* | 8/2013 | Lu | H04N 19/58 375/E7.243 |
| 2014/0177706 A1* | 6/2014 | Fernandes | H04N 19/59 375/240.03 |
| 2014/0233645 A1 | 8/2014 | Sakamoto | |
| 2014/0301473 A1 | 10/2014 | Park et al. | |
| 2015/0304671 A1 | 10/2015 | Deshpande | |
| 2016/0301895 A1* | 10/2016 | Lu | H04N 19/154 |
| 2017/0214938 A1 | 7/2017 | Zhang et al. | |
| 2018/0249177 A1* | 8/2018 | Lin | H04N 19/513 |
| 2019/0045217 A1 | 2/2019 | Gokhale et al. | |
| 2019/0124346 A1* | 4/2019 | Ren | G06N 3/044 |
| 2019/0289286 A1 | 9/2019 | Kitamura et al. | |
| 2020/0120342 A1* | 4/2020 | Zhang | H04N 19/172 |

FOREIGN PATENT DOCUMENTS

| | | | |
|---|---|---|---|
| CN | 106878750 | A | 6/2017 |
| CN | 107820095 | A | 3/2018 |
| CN | 110740318 | A | 1/2020 |
| CN | 110839155 | A | 2/2020 |
| CN | 111405282 | A | 7/2020 |
| RU | 2533196 | C2 | 11/2014 |
| WO | 2020034921 | A1 | 2/2020 |

OTHER PUBLICATIONS

The State Intellectual Property Office of People's Republic of China, First Office Action in Patent Application No. CN202010318681.1 issued on Oct. 29, 2021, which is a foreign counterpart application corresponding to this U.S. Patent Application, to which this application claims priority.

The State Intellectual Property Office of People's Republic of China, Notification to Grant Patent Right for Invention of Chinese application No. 202010318681.1 issued on Feb. 23, 2022, which is foreign counterpart application of this US application.

Ma, Xiang, et al.; "AHG17: 0n long-term reference picture signaling", Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0134_r1, Oct. 11, 2019.

Extended European Search Report Communication Pursuant to Rule 62 EPC, dated Aug. 18, 2023 in Patent Application No. EP 21792957.9, which is a foreign counterpart application to which this application claims priority.

Decision of Grant of Russian application No. 2022129325/07 issued on May 12, 2023.

* cited by examiner

METHOD FOR CODING A VIDEO BASED ON A LONG-TERM REFERENCE FRAME, DEVICE, AND STORAGE MEDIUM

CROSS-REFERENCE TO RELATED APPLICATION

This application is a U.S. national stage of international application No. PCT/CN2021/088586, filed on Apr. 21, 2021, which claims priority to Chinese Patent Application No. 202010318681.1, filed on Apr. 21, 2020, and entitled "VIDEO CODING METHOD AND DEVICE BASED ON LONG-TERM REFERENCE FRAME, EQUIPMENT AND STORAGE MEDIUM", the disclosures of which are herein incorporated by reference in their entireties.

TECHNICAL FIELD

Embodiments of the present disclosure relate to the field of image processing technologies, and in particular, relate to a method for coding a video based on a long-term reference frame, a device, and a storage medium.

BACKGROUND

Inter prediction coding is an important method commonly used in video coding to improve compression performance. In this method, an optimal matching block is searched for in a reference frame through motion estimation, then a prediction block of a current block is predicted using a motion compensation technology, such that a residual block is acquired, and subsequent compression processing in the video coding such as transformation, quantization, and entropy coding are implemented using the residual block.

SUMMARY

The present disclosure provides a method for coding a video based long-term frame, a device, and a storage medium.

According to some embodiments of the present disclosure, a method for coding a video based on a long-term reference frame is provided. The method includes: setting a long-term reference frame according to attribute information of an image frame; determining a reference index of a to-be-coded image frame based on a normal reference frame and the long-term reference frame; and acquiring a target matching block by performing inter prediction based on the reference index, so as to achieve coding of the to-be-coded image frame; wherein setting the long-term reference frame according to the attribute information of the image frame comprises: setting the long-term reference frame based on a degree of redundancy in a time domain and a degree of redundancy in a spatial domain of the image frame, the degree of redundancy in the time domain indicating a degree of having a same coding macroblock in the image frame and a neighboring image frame thereof, and the degree of redundancy in the spatial domain indicating a degree of having a same coding macroblock within the image frame.

According to some embodiments of the present disclosure, a computer device for coding a video based on a long-term reference frame is provided. The device includes one or more processors; and a memory, configured to store one or more programs, wherein the one or more programs, when loaded and run by the one or more processors, cause the one or more processors to perform the method for coding the video based on the long-term reference frame as defined in any one of the embodiments of the present disclosure.

According to some embodiments of the present disclosure, a non-transitory computer-readable storage medium is provided. The non-transitory computer-readable storage medium stores one or more computer programs, wherein the one or more computer programs, when loaded and run by a processor of a computer device, cause the computer device to perform the method for coding the video based on the long-term reference frame as defined in any one of the embodiments of the present disclosure.

DETAILED DESCRIPTION

The present disclosure is described hereafter with reference to the accompanying drawings and the embodiments. It can be understood that the embodiments described herein are merely used to explain the present disclosure, but not intended to limit the present disclosure. In addition, it should be further noted that, for ease of description, the accompanying drawings show only some but not all structures related to the present disclosure.

Embodiment 1

Figure 1:
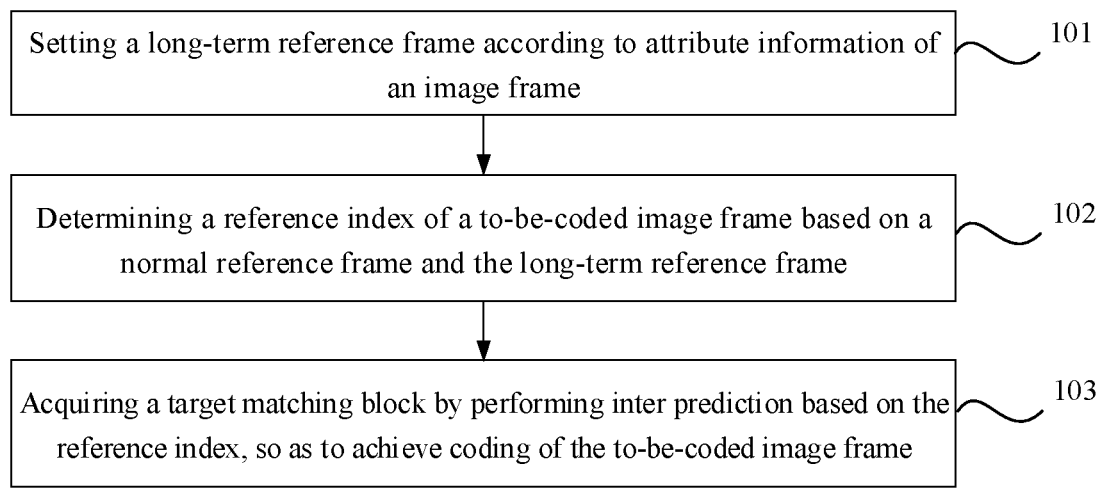
FIG. 1 is a flowchart of a method for coding a video based on a long-term reference frame according to Embodiment 1 of the present disclosure.

FIG. 1 is a flowchart of a method for coding a video based on a long-term reference frame according to Embodiment 1 of the present disclosure. This embodiment may be applicable to a case where a long-term reference frame is used to perform image coding. The method may be performed by an apparatus for coding a video based on a long-term reference frame, wherein the apparatus may be achieved by hardware and/or software. Referring to FIG. 1, the method for coding the video based on the long-term reference frame provided in this embodiment of the present disclosure may include the following processes.

In process 101, a long-term reference frame is set according to attribute information of an image frame.

The image frame may be any image frame in a video that needs to be coded. The attribute information may be data describing the image frame. The attribute information may be stored in association with the image frame. The attribute information may indicate whether a corresponding image frame is a key frame or a scenario switching frame. The attribute information may be generated by an analysis module in the related art, and the generation of the attribute information is not described in detail in this embodiment of the present disclosure. There are two types of reference frames for inter prediction coding: a short-term reference frame and a long-term reference frame. Compared with the short-term reference frame, the long-term reference frame can provide a longer reference, an interval of two long-term reference frames in a time domain is longer, and compression coding performance using the long-term reference frame is better for a video with little background change. The long-term reference frame may be an image frame for reference stored in a decoded picture buffer (DPB), and the DPB may include an image that is coded and may store a short-term reference frame, a long-term reference frame, a non-reference frame, and the like. However, a video coding scheme known to the inventor only supports the long-term reference frame functionally, which greatly increases the coding complexity and reduces the compression coding speed.

In the embodiments of the present disclosure, the long-term reference frame may be set according to the attribute information of each image frame of a plurality of image frames in a video. For example, in a case that a degree of redundancy in a spatial domain of an image frame exceeds a threshold, the image frame may be set as the long-term reference frame. In a case that attribute information of an image frame indicates that the image frame is the first image frame of a video, the image frame may be set as the long-term reference frame.

In process 102, a reference index of a to-be-coded image frame is determined based on a normal reference frame and the long-term reference frame.

The normal reference frame may be a reference frame for inter prediction in the related art, and the normal reference frame may be an image frame adjacent to the to-be-coded image frame in a time sequence, for example, may be a previous frame or a subsequent frame of the to-be-coded image frame. The to-be-coded image frame may be an image frame that needs to be coded in a video, and one to-be-coded image frame in the video may be coded each time in the coding process of the video. The reference index may be frame-level relative location information of a matching block acquired from a reference frame set based on the to-be-coded image frame, and may include a frame-level index number of the normal reference frame and/or a frame-level index number of the long-term reference frame.

In this embodiment of the present disclosure, a reference frame that is most suitable for inter prediction for the to-be-coded image frame may be searched for in the normal reference frame and the long-term reference frame, and a frame-level index number of the reference frame may be stored as the reference index. It can be understood that the reference frame that is most suitable for inter prediction for the to-be-coded image frame may be an image frame with a minimum coding cost in the normal reference frame and/or the long-term reference frame, or may be an image frame closest to the to-be-coded image frame in a time sequence in the normal reference frame and/or the long-term reference frame. The reference index may include at least one of the frame-level index number of the normal reference frame and/or the frame-level index number of the long-term reference frame.

In process 103, a target matching block is acquired by performing inter prediction based on the reference index, so as to achieve coding of the to-be-coded image frame.

The target matching block may be a coding block being same or similar to a coding block in the to-be-coded image frame, having a minimum coding cost, and being found by performing inter prediction based on the reference index.

The to-be-coded image frame may be segmented into at least one coding macroblock, and for the at least one coding macroblock, the target matching block similar to the coding macroblock may be searched for based on the reference index. The to-be-coded image frame may be compressed and coded based on related information of the target matching block. It can be understood that process 103 and process 102 may be performed simultaneously. For example, each time one reference index of the to-be-coded image frame is determined, the target matching block corresponding to the to-be-code image frame may be acquired based on the reference frame. Alternatively, process 103 may be performed upon process 102 being completely performed. For example, upon all reference indexes of the to-be-coded image frame are determined, the target matching block is searched for based on the plurality of reference indexes.

In this embodiment of the present disclosure, an image frame is set as a long-term reference frame according to attribute information, the reference index of a to-be-coded image frame is determined based on the normal reference frame and the long-term reference frame, and the target matching block of the to-be-coded image frame is acquired by performing inter prediction based on the reference index, so as to achieve coding of the to-be-coded image frame. The long-term reference frame is preset according to the attribute information of the image frame, thereby achieving the accurate setting of the long-term reference frame. The reference index is determined based on the long-term reference frame, and the target matching block is acquired, thereby reducing computation overheads of the coding process, reducing coding complexity on the premise of ensuring compression performance of image coding, reducing the video coding duration, and achieving high-performance coding of the video image.

Based on the foregoing embodiment of the present disclosure, setting the long-term reference frame according to the attribute information of the image frame includes: extracting, for each image frame of a plurality of image frames, a frame type in attribute information corresponding to the image frame; and setting an image frame corresponding to the frame type as the long-term reference frame in a case that the frame type is a key frame and/or a scenario switching frame.

The frame type may be information describing a usage or content of an image frame. In the case that the frame type is used to describe the usage of the image frame, the frame type may include a key frame I, a non-key frame P, a non-key frame B, and the like. In the case that the frame type is used to describe the content, the frame type may include a scenario switching frame, a scenario frame, and the like. The key frame may indicate that the image frame is used as a reference frame in a coding process, and the scenario switching frame may indicate that the content of the image frame may include content of scenario switching. For example, in a case that content of an image frame is an image of a person entering outdoors from indoors, the image frame may be a scenario switching frame.

The attribute information of each image frame of the plurality of image frames in the video may be acquired. In the case that a frame type in attribute information of an image frame is a key frame and/or a scenario switching frame, the image frame may be set as a long-term reference frame. For example, the image frame may be stored in the DPB and an identifier of a long-term reference frame may be set.

Based on the foregoing embodiment of the present disclosure, setting the long-term reference frame according to the attribute information of the image frame includes: setting the long-term reference frame based on a degree of redundancy in a time domain and a degree of redundancy in a spatial domain of the image frame.

In this embodiment of the present disclosure, the degree of redundancy in the time domain may indicate a degree of having a same coding macroblock in the image frame and a neighboring image frame, and a larger quantity of same coding macroblocks in the image frame and the neighboring image frame indicates a higher corresponding degree of redundancy in the time domain. The degree of redundancy in the spatial domain may indicate a degree of having a same coding macroblock within the image frame, and a larger quantity of same coding macroblocks within the image frame indicates a higher corresponding degree of redundancy in the spatial domain. Because the long-term reference frame needs to be used as a reference frame for a long time, and the degree of redundancy in the spatial domain of the long-term reference frame is relatively high, an image frame whose degree of redundancy in the spatial domain is greater than the degree of redundancy in the time domain may be selected and set as the long-term reference frame, or a ratio of the degree of redundancy in the time domain to the degree of redundancy in the spatial domain is acquired, and an image frame whose ratio is less than a threshold is set as the long-term reference frame.

Embodiment 2

Figure 2:
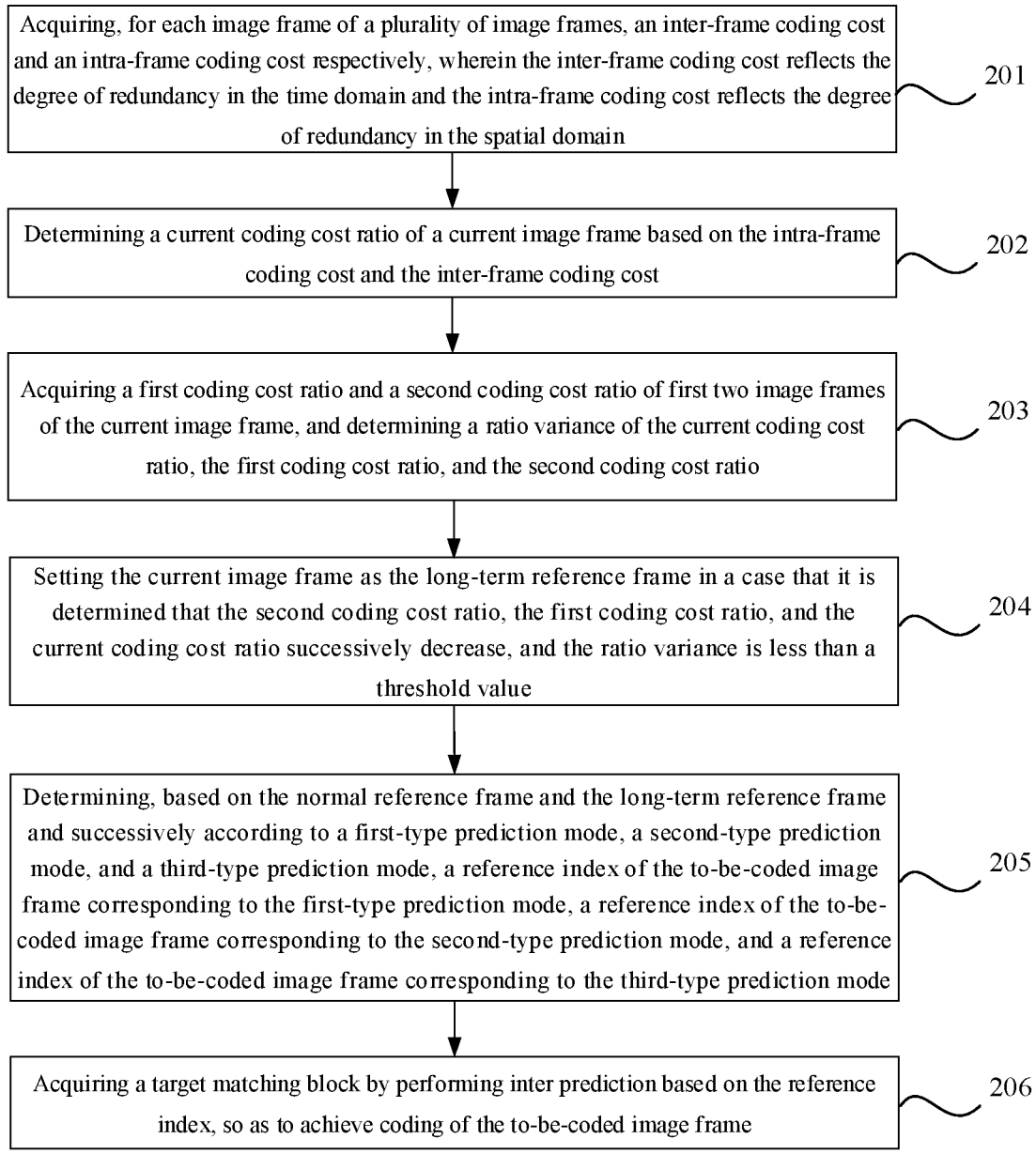
FIG. 2 is a flowchart of a method for coding a video based on a long-term reference frame according to Embodiment 2 of the present disclosure.

FIG. 2 is a flowchart of a method for coding a video based on a long-term reference frame according to Embodiment 2 of the present disclosure. This embodiment of the present disclosure is described on the basis of the foregoing embodiment. The long-term reference frame is set based on the degree of redundancy in the time domain and the degree of redundancy in the spatial domain of the image frame. Referring to FIG. 2, the method for coding the video based on the long-term reference frame provided in this embodiment of the present disclosure includes the following processes.

In process 201, for each image frame of a plurality of image frames, an inter-frame coding cost and an intra-frame coding cost are respectively acquired, wherein the inter-frame coding cost reflects the degree of redundancy in the time domain and the intra-frame coding cost reflects the degree of redundancy in the spatial domain, the degree of redundancy in the time domain being inversely proportional to the inter-frame coding cost, and the degree of redundancy in the spatial domain being inversely proportional to the intra-frame coding cost.

The inter-frame coding cost may represent coding complexity generated during inter-frame coding of the image frame. In the case that the coding complexity is lower, the inter-frame coding cost may be lower. The inter-frame coding cost may be inversely proportional to the degree of redundancy in the time domain, and a higher degree of redundancy in the time domain of an image frame may correspond to a lower inter-frame coding cost. The intra-frame coding cost may represent coding complexity generated during the intra-frame coding of the image frame. In the case that the coding complexity is lower, the intra-frame coding cost may be lower. The intra-frame coding cost may be inversely proportional to the degree of redundancy in the spatial domain, and a higher degree of redundancy in the spatial domain of an image frame may correspond to a lower intra-frame coding cost.

In this embodiment of the present disclosure, the intra-frame coding cost and the inter-frame coding cost may be generated by a pre-analysis module of an encoder. The intra-frame coding cost and the inter-frame coding cost may be stored together with the image frame as attribute information. When coding the video, the attribute information of the image frame may be acquired in advance. The intra-frame coding cost can reflect the degree of redundancy in the spatial domain of the image frame, and the inter-frame coding cost can reflect the degree of redundancy in the time domain of the image frame.

In process 202, a current coding cost ratio of a current image frame is determined based on the intra-frame coding cost and the inter-frame coding cost. The current image frame is one frame of a plurality of image frames in a to-be-coded video.

The current coding cost ratio may be a ratio of the intra-frame coding cost to the inter-frame coding cost and may be used to measure the degree of redundancy in the spatial domain and the degree of redundancy in the time domain of the image frame. A redundancy is inversely proportional to a coding cost. For example, the smaller the current coding cost ratio is, the higher the degree of redundancy in the spatial domain of the image frame is relative to the degree of redundancy in the time domain, and during inter-frame coding, the image frame may be used as the long-term reference frame.

In this embodiment of the present disclosure, a ratio of an intra-frame coding cost to an inter-frame coding cost of each image frame of the plurality of image frames in the video may be calculated as a current coding cost ratio of each image frame, wherein the inter-frame coding cost may reflect the degree of redundancy in the time domain of the image frame, the intra-frame coding cost may reflect the degree of redundancy in the spatial domain of the image frame, and a degree of redundancy is inversely proportional to a coding cost.

In process 203, a first coding cost ratio and a second coding cost ratio of first two image frames of the current image frame are acquired, and a ratio variance of the current coding cost ratio, the first coding cost ratio, and the second coding cost ratio is determined.

A previous image frame may be an image frame at a previous moment of the current image frame in a time sequence, and the first two image frames may be image frames at the first two moments of the current image frame in the time sequence. The first coding cost ratio may be a ratio of an intra-frame coding cost to an inter-frame coding cost of the previous image frame, and the second coding cost ratio may be a ratio of an intra-frame coding cost to an inter-frame coding cost of an image frame in front of the previous image frame.

The first two image frames of each image frame may be searched for in the DBP, an intra-frame coding cost and an inter-frame coding cost of each of the first two image frames may be separately acquired, and the first coding cost ratio of the previous image frame and the second coding cost ratio of another image frame in the corresponding first two image frames are separately calculated. The ratio variance is calculated based on a coding cost ratio of a current image frame, the coding cost ratio of the previous image frame, and the coding cost ratio of the another image frame, to determine a change of a coding cost ratio at the position of each image frame.

In process 204, the current image frame is set as the long-term reference frame in a case that it is determined that the second coding cost ratio, the first coding cost ratio, and the current coding cost ratio successively decrease, and the ratio variance is less than a threshold value.

The threshold value may be a value close to zero. In the case that the ratio variance is less than the value, it may be considered that the value of the ratio variance is 0.

The change of the coding cost ratio at the position of the current image frame may be determined based on the current coding cost ratio, the first coding cost ratio, and the second coding cost ratio. In the case that it is determined that the current coding cost ratio is less than the first coding cost ratio and the first coding cost ratio is less than the second coding cost ratio, the coding cost ratios of the image frames may be gradually reduced. In the case that the ratio variance is less than the value threshold, it may be determined that the change of the coding cost ratio at the position of the current image frame is 0, and it may be determined that the current coding cost ratio of the current image frame is a polar point of coding cost ratios of several neighboring image frames, and the image frame may be used as a reference frame of a neighboring image frame for a long time. In this case, the current image frame may be set as the long-term reference frame.

In process 205, a reference index of the to-be-coded image frame corresponding to a first-type prediction mode, a reference index of the to-be-coded image frame corresponding to a second-type prediction mode, and a reference index of the to-be-coded image frame corresponding to a third-type prediction mode are determined based on the normal reference frame and the long-term reference frame and successively according to the first-type prediction mode, the second-type prediction mode, and the third-type prediction mode, wherein the first-type prediction mode at least includes a MERGE prediction mode and/or a SKIP prediction mode, the second-type prediction mode at least includes a 2N*2N prediction mode and/or a BIDIR prediction mode, and the third-type prediction mode at least includes a 2N*N prediction mode, an N*2N prediction mode, a 2N*nD prediction mode, a 2N*nU prediction mode, an nR*2N prediction mode, and/or an nL*2N prediction mode.

There may be a plurality of prediction modes. For example, the High Efficiency Video Coding (HEVC) standard may include 10 types of prediction modes, such as MERGE/SKIP/2N*2N/BIDIR/2N*N/N*2N/2N*nD/2N*nU/nR*2N/nL*2N. In a case that a reference index is separately selected in each prediction mode, calculation complexity is greatly increased. Therefore, the prediction modes may be classified into the first-type prediction mode, the second-type prediction mode, and the third-type prediction mode, and the reference index of the to-be-coded image frame may be successively determined in an order of the first-type prediction mode, the second-type prediction mode, and the third-type prediction mode. The reference index of the second-type prediction mode may be generated by directly using the reference index of the first-type prediction mode, and the reference index of the third-type prediction mode may be generated by directly using the reference index of the first-type prediction mode and the reference index of the second-type prediction mode. Therefore, a repetition process of generating the reference index can be reduced, and the complexity of generating the reference index is reduced. In this embodiment of the present disclosure, the prediction modes may be classified into three types, wherein the first-type prediction mode at least includes the MERGE prediction mode and/or the SKIP prediction mode, the second-type prediction mode at least includes the 2N*2N prediction mode and/or the BIDIR prediction mode, and the third-type prediction mode at least includes the 2N*N prediction mode, the N*2N prediction mode, the 2N*nD prediction mode, the 2N*nU prediction mode, the nR*2N prediction mode, and/or the nL*2N prediction mode.

In process 206, a target matching block is acquired by performing inter prediction based on the reference index, so as to achieve coding of the to-be-coded image frame.

In this embodiment of the present disclosure, an inter-frame coding cost of each image frame is acquired for reflecting a degree of redundancy in a time domain and an intra-frame coding cost of each image frame is acquired for reflecting a degree of redundancy in a spatial domain; a ratio of the intra-frame coding cost to the inter-frame coding cost is used as a current coding cost ratio; a first coding cost ratio and a second coding cost ratio of the first two image frames of each image frame are separately acquired, and a ratio variance is determined based on the current coding cost ratio, the first coding cost ratio, and the second coding cost ratio; and in the case that it is determined that the current image frame is a polar point based on the current coding cost ratio, the first coding cost ratio, the second coding cost ratio, and the ratio variance, the current image frame is set as a long-term reference frame. Then, a reference index of the image frame corresponding to a first-type prediction mode, a reference index of the image frame corresponding to a second-type prediction mode, and a reference index of the image frame corresponding to a third-type prediction mode are determined based on a normal reference frame and the long-term reference frame and successively according to the first-type prediction mode, the second-type prediction mode, and the third-type prediction mode. A target matching block is searched for based on the reference index, so as to achieve coding of the to-be-coded image frame. Therefore, the long-term reference frame is accurately set, coding performance is improved, coding complexity is reduced, and an image compression ratio is improved on the premise of ensuring image compression performance, thereby reducing bandwidth costs and improving user experience.

Embodiment 3

Figure 3:
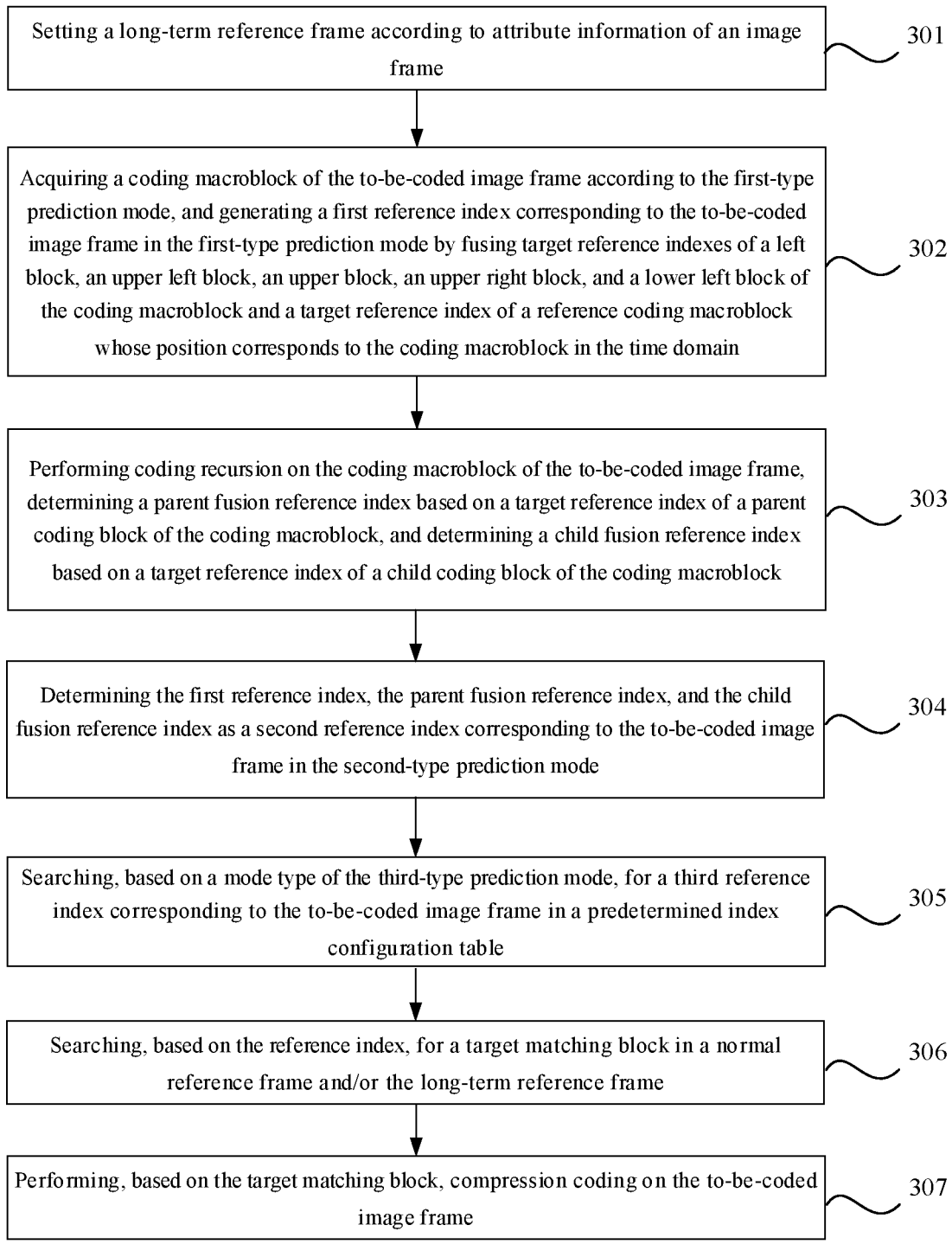
FIG. 3 is a flowchart of a method for coding a video based on a long-term reference frame according to Embodiment 3 of the present disclosure.

FIG. 3 is a flowchart of a method for coding a video based on a long-term reference frame according to Embodiment 3 of the present disclosure. This embodiment of the present disclosure is described based on the foregoing embodiment, in which a search range for inter prediction mode is reduced, such that coding complexity is reduced on the premise of ensuring a compression effect. Referring to FIG. 3, the method for coding the video based on the long-term reference frame in this embodiment of the present disclosure includes the following processes.

In process 301, a long-term reference frame is set according to attribute information of an image frame.

In process 302, a coding macroblock of the to-be-coded image frame is acquired according to the first-type prediction mode, and a first reference index corresponding to the to-be-coded image frame in the first-type prediction mode is generated by fusing target reference indexes of a left block, an upper left block, an upper block, an upper right block, and a lower left block of the coding macroblock and a target reference index of a reference coding macroblock whose position corresponds to the coding macroblock in a time domain, wherein the reference coding macroblock is located in the normal reference frame and/or the long-term reference frame.

The coding macroblock may be a set of pixels in the to-be-coded image frame. For example, 64 pixels may form one coding macroblock, and the coding macroblock may be a smallest unit for coding the image frame. The reference coding macroblock may be a smallest unit for coding the long-term reference frame and/or the normal reference frame, and the reference coding macroblock may be formed by a plurality of pixels. The left block may be a coding macroblock located on the left side of the coding macroblock, and other blocks may be coding macroblocks located at corresponding locations of the coding macroblock.

Figure 4:
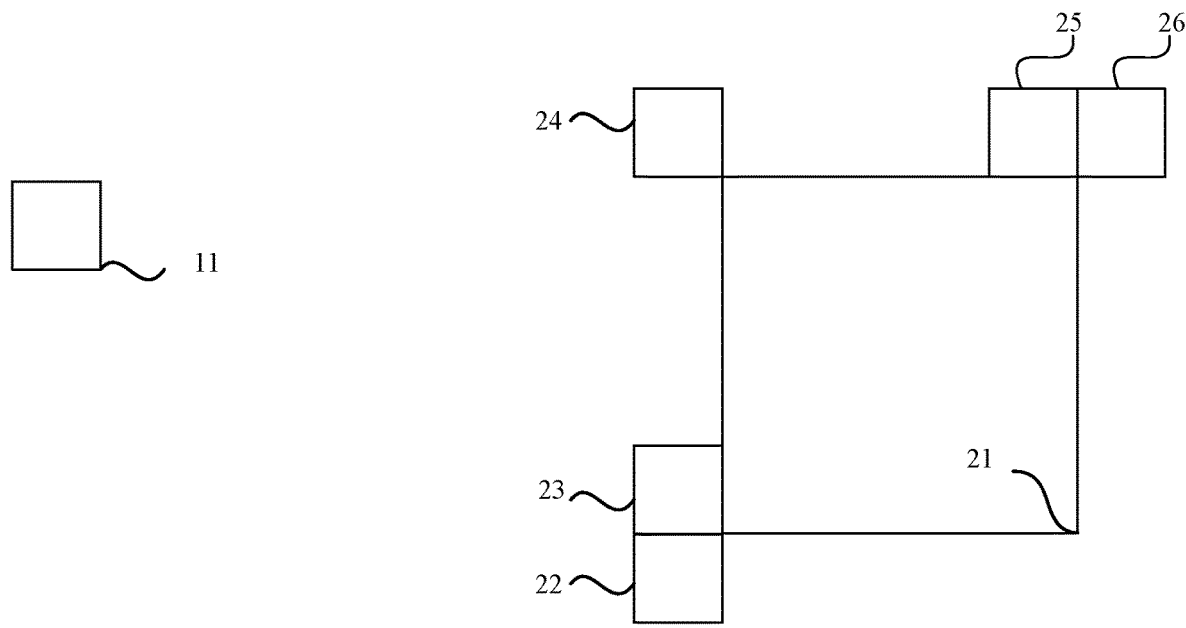
FIG. 4 is a schematic diagram of a search location of a coding macroblock in a first reference index according to Embodiment 3 of the present disclosure.

In the case that the reference index is acquired according to the first-type prediction mode, in the MERGE/SKIP prediction mode, motion estimation is not required, motion compensation is directly performed based on indexed inter-frame coding information of a neighboring block in the spatial domain and a block whose position corresponds to the coding macroblock in the time domain, and a target macroblock with a minimum coding cost is finally determined as inter-frame coding information of the coding macroblock. During motion compensation, inter-frame coding information of the left block, the upper left block, the upper block, the upper right block, and the lower left block of the coding macroblock may be used in the spatial domain, and inter-frame coding information of the reference coding macroblock at a same relative location with the coding macroblock may be used in the time domain, wherein a reference frame in the time domain may include a normal reference frame and/or a long-term reference frame. A reference index of a reference coding macroblock with optimal reference information may be determined as the target reference index, for example, a frame-level index number of a coding macroblock with a minimum coding cost or a frame-level index number of a coding macroblock that is closest to the to-be-coded image frame in the time sequence in the normal reference frame and/or the long-term reference frame. The target reference indexes of the left block, the upper left block, the upper block, the upper right block, and the lower left block and the target reference index of the reference coding macroblock whose position corresponds to the coding macroblock in the time domain may be stored in the first reference index. FIG. 4 is a schematic diagram of a search location of a coding macroblock in the first reference index according to Embodiment 3 of the present disclosure. Referring to FIG. 4, a reference frame and an image frame may be segmented into a plurality of reference coding macroblocks 11 and a plurality of coding macroblocks 21. Optimal reference indexes of a neighboring block in the spatial domain of the coding macroblock 21 and a reference coding block whose position corresponds to the coding macroblock in the time domain may be fused to acquire a fused reference index $RefMask_d = \sum_{i=0}^{k} RefMask_i$, wherein d represents a depth of a coding block, and RefMask$_i$ represents a reference index of the $(i+1)^{th}$ block. The first block is a left block of the current coding block 21 in the image frame, the second block is an upper left block of the current coding block 21 in the image frame, the third block is an upper block of the current coding block 21 in the image frame, the fourth block is an upper right block of the current coding block 21 in the image frame, the fifth block is a lower left block of the current coding block 21 in the image frame, and the sixth block is a reference coding macroblock in the reference frame whose position corresponds to the coding macroblock. In HEVC, k=5, that is, there is a total of k+2 coding macroblocks, which include a left block 23, an upper left block 24, an upper block 25, an upper right block 26, and a lower left block 22 of the current coding macroblock 21 in the image frame, and a reference coding macroblock 11 in the reference frame whose position corresponds to the coding macroblock. During the generation of a reference index, the reference frame may be a forward reference frame or a backward reference frame. A reference index $RefMask_i$ of the $(i+1)^{th}$ block meets $RefMask_i = 1 << RefForward_i + (1 << RefBackward_i) << 16$, wherein RefForward$_i$ represents a forward reference index of the $(i+1)^{th}$ block (a frame-level index number of the forward reference frame), and RefBackward$_i$ represents a backward reference index of the $(i+1)^{th}$ block (a frame-level index number of the backward reference frame). The frame-level index number of the backward reference frame may be stored in 16 high-order bits in the first reference index, and the frame-level index number of the forward reference frame may be stored in 16 low-order bits in the first reference index. That is, in a case that the reference frame including the $(i+1)^{th}$ block is the forward reference frame, the reference index $RefMask_{i_o}$ of the $(i+1)^{th}$ block is an index acquired by moving 1 to the left by RefForward$_i$, and in a case that the reference frame including the $(i+1)^{th}$ block is the backward reference frame, the reference index RefMask$_1$ of the $(i+1)^{th}$ block is an index acquired by moving 1 to the left by RefBackward$_i$ and then by 16 bits. An OR operation is performed at corresponding locations of reference indexes of the six blocks to acquire the first reference index of the coding macroblock 21, wherein + represents the OR operation. In the case that the reference frame including the $(i+1)^{th}$ block is the forward reference frame, a backward reference index of the $(i+1)^{th}$ block is 0, and in the case that the reference frame including the $(i+1)^{th}$ block is the backward reference frame, a forward reference index of the $(i+1)^{th}$ block is 0.

In process 303, coding recursion is performed on the coding macroblock of the to-be-coded image frame, a parent fusion reference index is determined based on a target reference index of a parent coding block of the coding macroblock, and a child fusion reference index is determined based on a target reference index of a child coding block of the coding macroblock.

The coding recursion is a process of continuing to perform recursive segmentation on the coding macroblock. That is, in the coding recursion, the coding macroblock may be further segmented. For example, a size of the coding macroblock is 64*64, and the coding macroblock may be segmented into four child coding blocks with a size of 32*32. In the coding recursion process, the size of the child coding block may vary according to a different depth of segmentation. The child coding block may be generated by segmenting the coding macroblock, and the parent coding block may be a coding macroblock whose depth is at least less than a depth of a child coding block thereof by one. For example, for a child coding block with a depth of 3, a depth of the parent coding block thereof may be 2, 1, or 0.

In this embodiment of the present disclosure, coding recursion may be performed on the to-be-coded image frame, the coding macroblock of the to-be-coded image frame is further segmented to generate child coding blocks of different depths, and a reference index of each of the child coding blocks is acquired. For each of the child coding blocks, a reference index of a parent coding block corresponding to each of the coding blocks and a reference index of a child coding block corresponding to each of the child coding blocks may be generated. For example, for a child coding block, reference indexes of a left child block, an upper left child block, an upper child block, an upper right child block, and a lower left child block of the present child coding block and a reference index of a reference child coding block locating at a same time domain position as the present child coding block are acquired as reference indexes corresponding to the present child coding block. In this way, child fusion reference indexes of all child coding blocks and parent fusion reference indexes of all parent coding blocks of the present child coding block are acquired.

For example, in a case that a depth d of a child coding block is greater than or equal to 1, a parent fusion reference index of a parent coding block of the child coding block may be acquired through RefMaskSum=$\Sigma_{j=d-1}^{0}$RefMask$_j$ (d≥1), wherein RefMask$_j$ represents a first reference index of a parent coding block of the child coding block at a depth j. In a case that recursion can be sequentially performed on the child coding block downward, upon the recursion is completed, a reference index of each child coding block of the child coding block may be acquired. The child fusion reference index may be acquired by collecting reference indexes of a plurality of child coding blocks, and specifically, the child fusion reference index meets SplitRefSum=$\Sigma_{m=0}^{3}$SplitRef$_m$, wherein SplitRef$_m$ represents a reference index of the (m+1)$^{th}$ child coding block, and a maximum value of m is 3, which indicates that the coding macroblock is segmented into four child coding blocks.

In process 304, the first reference index, the parent fusion reference index, and the child fusion reference index are determined as a second reference index corresponding to the to-be-coded image frame in the second-type prediction mode.

The second reference index corresponding to the to-be-coded image frame in the second-type prediction mode may be acquired by fusing the first reference index, the parent fusion reference index, and the child fusion reference index. For example, a collection of the first reference index, the parent fusion reference index, and the child fusion reference index may be determined as the second reference index, and the second reference index meets RefMaskSum=$\Sigma_{j=d-1}^{0}$RefMask$_j$(d≥1)+RefMask$_d$+SplitRefSum, wherein $\Sigma_{j=d-1}^{0}$RefMask$_j$ may represent the parent fusion reference index, SplitRefSum may represent the child fusion reference index, and RefMask$_d$ may represent the first reference index. The fused second reference index RefMaskSum is used to limit a search of the 2N*2N mode. The reference index at this time adaptively excludes or includes the long-term reference frame, such that the coding efficiency can be improved without increasing the coding complexity.

In process 305, a third reference index corresponding to the to-be-coded image frame is searched for, based on a mode type of the third-type prediction mode, in a predetermined index configuration table.

The predetermined index configuration table may store an information table of reference indexes generated in the recursive coding process, and in the predetermined index configuration table, a prediction mode may be stored in association with a reference index acquiring manner corresponding to the prediction mode.

Figure 5:
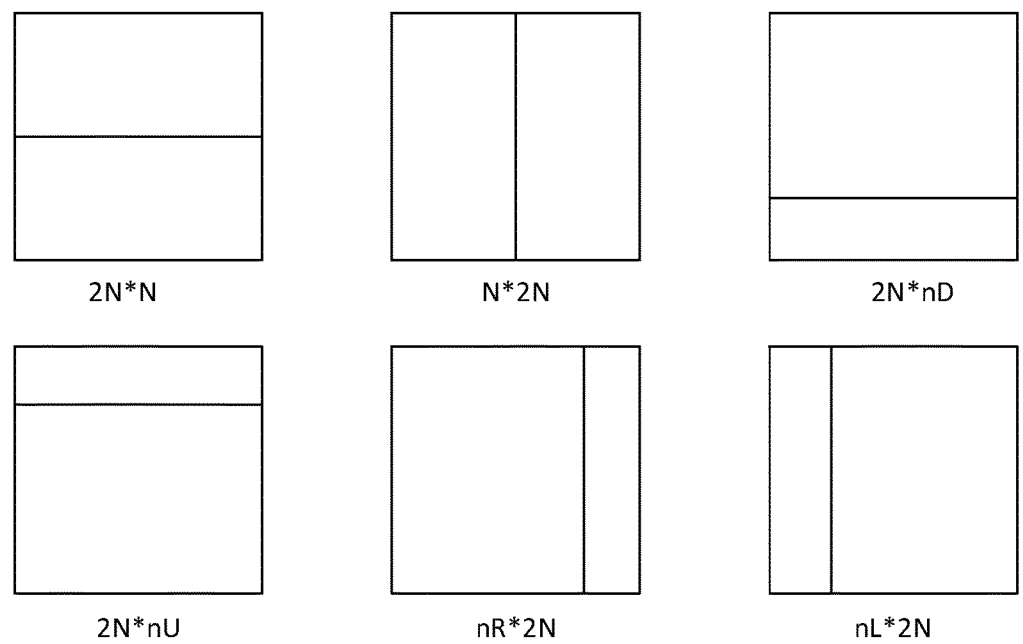
FIG. 5 is an example diagram of a prediction mode according to Embodiment 3 of the present disclosure.

In this embodiment of the present disclosure, a corresponding reference index may be searched for according to the mode type of the third-type prediction mode. For example, FIG. 5 is an example diagram of a prediction mode according to Embodiment 3 of the present disclosure. Referring to FIG. 5, prediction modes may include a 2N*N prediction mode, an N*2N prediction mode, a 2N*nD prediction mode, a 2N*nU prediction mode, an nR*2N prediction mode, and an nL*2N prediction mode.

Based on the foregoing embodiment of the present disclosure, a correspondence relationship between a mode type and the third reference index in the predetermined index configuration table includes at least one of the following: in a case that the mode type is the 2N*N prediction mode, an upper index in the third reference index is determined based on a target reference index of a first child coding block and a target reference index of a second child coding block in the coding recursion, and a lower index in the third reference index is determined based on a target reference index of a third child coding block and a target reference index of a fourth child coding block in the coding recursion process; in a case that the mode type is the N*2N prediction mode, a left index in the third reference index is determined based on the target reference index of the first child coding block and the target reference index of the third child coding block in the coding recursion, and a right index in the third reference index is determined based on the target reference index of the second child coding block and the target reference index of the fourth child coding block in the coding recursion; in a case that the mode type is the 2N*nD prediction mode, the upper index in the third reference index is the second reference index, and the lower index in the third reference index is determined based on the target reference index of the third child coding block and the target reference index of the fourth child coding block in the coding recursion; in a case that the mode type is the 2N*nU prediction mode, the upper index in the third reference index is determined based on the target reference index of the first child coding block and the target reference index of the second child coding block in the coding recursion, and the lower index in the third reference index is the second reference index; in a case that the mode type is the nR*2N prediction mode, the left index in the third reference index is the second reference index, and the right index in the third reference index is determined based on the target reference index of the second child coding block and the target reference index of the fourth child coding block in the coding recursion; and in a case that the mode type is the nL*2N prediction mode, the left index in the third reference index is determined based on the target reference index of the first child coding block and the target reference index of the third child coding block in the coding recursion, and the right index in the third reference index is the second reference index.

The first child coding block, the second child coding block, the third child coding block, and the fourth child coding block may be four child coding blocks generated by segmenting the coding macroblock of the to-be-coded image frame during coding recursion, and the four child coding blocks may be respectively denoted as the first child coding block, the second child coding block, the third child coding block, and the fourth child coding block in an upper left, top right, lower left, and lower right order.

In this embodiment of the present disclosure, in the third-type prediction mode, a reference index may be acquired based on a location correspondence relationship in the predetermined index configuration table, wherein the predetermined index configuration table may be shown in the following table:

| Predetermined index configuration table | |
|---|---|
| Mode | Reference index |
| 2N*N | TOP: SplitRef$_0$ + SplitRef$_1$ <br> DOWN: SplitRef$_2$ + SplitRef$_3$ |
| N*2N | LEFT: SplitRef$_0$ + SplitRef$_2$ <br> RIGHT: SplitRef$_1$ + SplitRef$_3$ |

-continued

Predetermined index configuration table

| Mode | Reference index |
|---|---|
| 2N*nD | TOP: Ref2N × 2N |
|  | DOWN: SplitRef$_2$ + SplitRef$_3$ |
| 2N*nU | TOP: SplitRef$_0$ + SplitRef$_1$ |
|  | DOWN: Ref2N × 2N |
| nR*2N | LEFT: Ref2N × 2N |
|  | RIGHT: SplitRef$_1$ + SplitRef$_3$ |
| nL*2N | LEFT: SplitRef$_0$ + SplitRef$_2$ |
|  | RIGHT: Ref2N × 2N |

TOP may represent an upper index, DOWN may represent a lower index, LEFT may represent a left index, and RIGHT may represent a right index. SplitRef$_0$, SplitRef$_2$, SplitRef$_3$, SplitRef$_4$, and Ref2N*2N may respectively represent the target reference index of the first child coding block, the target reference index of the second child coding block, the target reference index of the third child coding block, the target reference index of the fourth child coding block, and the second reference index.

In process 306, the target matching block is searched for based on the reference index in the normal reference frame and/or the long-term reference frame.

The normal reference frame may be a normal short-term reference frame in the related art, and the short-term reference frame may be a neighboring frame of the to-be-coded image frame. It can be understood that for the to-be-coded image frame, when searching for the target matching block based on the reference index, the target matching block may be searched for in both the normal reference frame and the long-term reference frame, wherein the target matching block may be a coding macroblock similar to the to-be-coded image frame in the normal reference frame and/or the long-term reference frame. For different prediction modes, different reference indexes may be used to search for the target matching block. For example, for the first-type prediction mode, the first reference index is used to search for the target matching block, for the second-type prediction mode, the second reference index is used to search for the target matching block, and for the third-type prediction mode, the third reference index is used to search for the target matching block.

In process 307, compression coding is performed on the to-be-coded image frame based on the target matching block.

The to-be-coded image frame may be compressed based on relative location information of the target matching block and image data in the target matching block, and the to-be-coded image frame may be represented in a form of relative displacement of a plurality of target matching blocks, thereby achieving compression coding of the to-be-coded image frame.

In this embodiment of the present disclosure, a long-term reference frame is set according to an attribute of an image frame, a coding macroblock of a to-be-coded image frame, a neighboring coding macroblock in the spatial domain thereof, and a neighboring reference coding macroblock in the time domain thereof are acquired according to a first-type prediction mode, a first reference index is generated based on a target reference index of the neighboring coding macroblock in the spatial domain and a target reference index of the reference coding macroblock. Coding recursion is performed on the coding macroblock, a child fusion reference index and a parent fusion reference index of the coding macroblock are generated during the coding recursion process, and a second reference index used for a second-type prediction mode is generated by combination. A third reference index of a third-type prediction mode may be generated by querying a predetermined index configuration table using a mode type. A target matching block is searched for based on a reference index, and the to-be-coded image frame is coded based on the target matching block. Therefore, proper search and coding of the long-term reference frame are achieved, and the target matching block is sequentially searched for according to predication modes of different types, thereby reducing the generation complexity of the reference index, narrowing down a search range, and improving coding efficiency and user experience.

Based on the foregoing embodiment of the present disclosure, searching, based on the reference index, for the target matching block in the normal reference frame and/or the long-term reference frame includes: in the 2N*2N prediction mode, in a case that it is determined that the normal reference frame and/or the long-term reference frame are/is not a target reference frame in the MERGE prediction mode, narrowing down a search range for the target matching block in the normal reference frame and/or the long-term reference frame.

In this embodiment of the present disclosure, in a case that the target matching block is searched for according to the 2N*2N prediction mode, because a currently found reference frame is not an optimal reference frame determined in the MERGE prediction mode, a probability that the target matching block can be found in the current reference frame is very small, wherein the current reference frame may be the normal reference frame or the long-term reference frame. To improve search efficiency, a search range for the target matching block in the current reference frame may be narrowed down, for example, may be narrowed down to ⅓ of an initial search range, and only ⅓ of reference frames in the normal reference frame and the long-term reference frame is selected for search.

Based on the foregoing embodiment of the present disclosure, searching, based on the reference index, for the target matching block in the normal reference frame and/or the long-term reference frame includes: searching, based on a diamond search algorithm and the reference index, for the target matching block in the normal reference frame and/or the long-term reference frame in a case that the attribute information of the to-be-coded image frame includes B-frame information and non-key frame information.

In the case that the attribute information of the to-be-coded image frame includes the B-frame information and the non-key frame information, the to-be-coded image frame may be a small B-frame. A role of the to-be-coded image frame in the video is not obvious, and the diamond search algorithm may be used to search for the target matching block, to improve a search speed of the target matching block.

Embodiment 4

Figure 6:
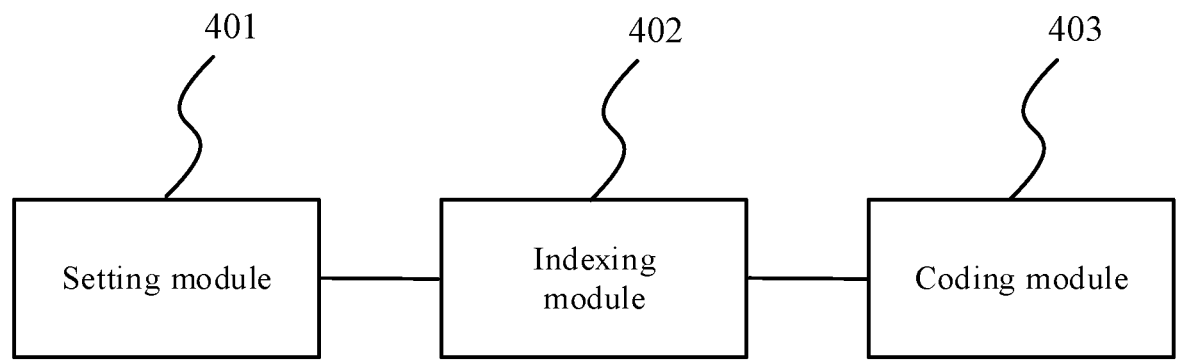
FIG. 6 is a schematic structural diagram of an apparatus for coding a video based on a long-term reference frame according to Embodiment 4 of the present disclosure.

FIG. 6 is a schematic structural diagram of an apparatus for coding a video based on a long-term reference frame according to Embodiment 4 of the present disclosure. The apparatus for coding the video based on a long-term reference frame may perform the method for coding the video based on the long-term reference frame provided in any embodiment of the present disclosure and include corresponding functional modules for performing the method. The apparatus may be achieved by software and/or hardware, and include a setting module 401, an indexing module 402, and a coding module 403.

The setting module 401 is configured to set a long-term reference frame according to attribute information of an image frame.

The indexing module 402 is configured to determine a reference index of a to-be-coded image frame based on a normal reference frame and the long-term reference frame.

The coding module 403 is configured to acquire a target matching block by performing inter prediction based on the reference index, so as to achieve coding of the to-be-coded image frame.

In this embodiment of the present disclosure, the setting module sets an image frame as a long-term reference frame according to attribute information, the indexing module determines a reference index of a to-be-coded image frame based on the long-term reference frame and a normal reference frame, and the coding module acquires a target matching block of the to-be-coded image frame by performing inter prediction based on the reference index, so as to achieve coding of the to-be-coded image frame. The long-term reference frame is preset according to the attribute information of the image frame, thereby achieving the accurate setting of the long-term reference frame. The reference index is determined based on the long-term reference frame, and the target matching block is acquired, thereby reducing computation overheads of the coding process, and reducing coding complexity on the premise of ensuring compression performance of image coding.

Embodiment 5

Figure 7:
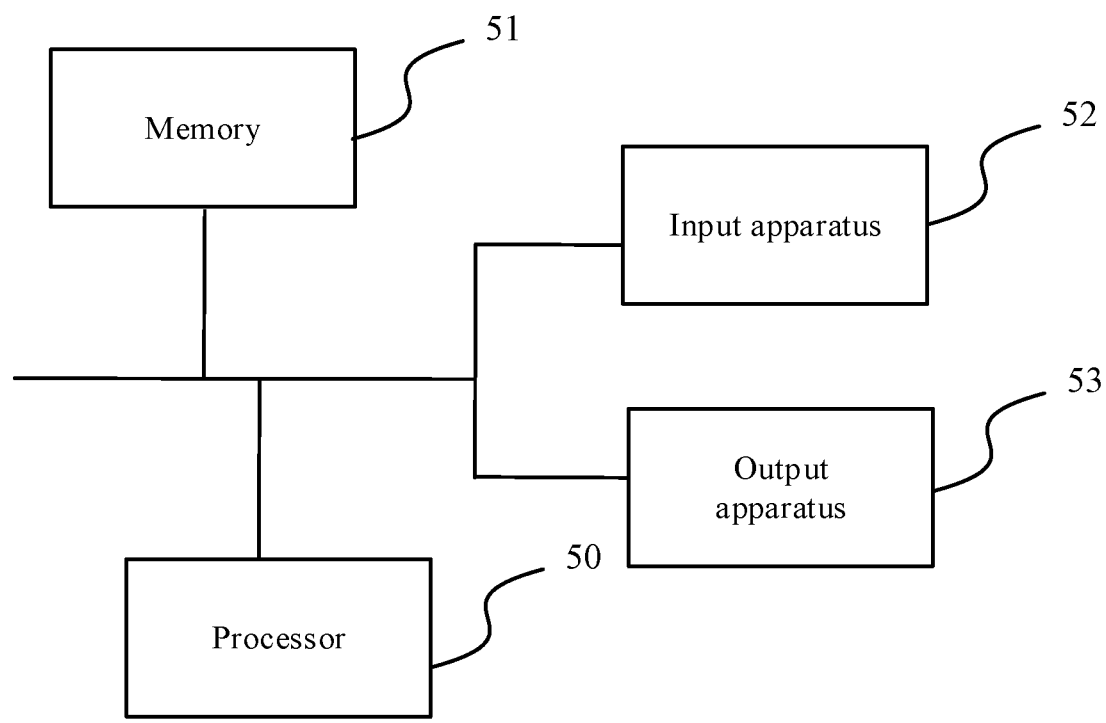
FIG. 7 is a schematic structural diagram of a device according to Embodiment 5 of the present disclosure.

FIG. 7 is a schematic structural diagram of a device according to Embodiment 5 of the present disclosure. As shown in FIG. 7, the device includes a processor 50, a memory 51, an input apparatus 52, and an output apparatus 53. There may be one or more processors 50 in the device. In FIG. 7, one processor 50 is used as an example. The processor 50, the memory 51, the input apparatus 52, and the output apparatus 53 of the device may be connected with each other via a bus or in another manner. In FIG. 7, for example, the connection is achieved via the bus.

As a computer-readable storage medium, the memory 51 may be configured to store one or more software programs, one or more computer-executable programs, and one or more modules, for example, modules (i.e. the setting module 401, the indexing module 402, and the coding module 403) of the apparatus for coding the video in Embodiment 4 of the present disclosure. The processor 50, when loading and running the one or more software programs, one or more instructions, or the one or more modules stored in the memory 51, performs a plurality of functional applications and data processing of the device, that is, performs the foregoing method for coding the video based on a long-term reference frame.

The memory 51 may mainly include a program storage area and a data storage area. The program storage area may store an operating system, and at least one application required by a function; and the data storage area may store data created according to the use of the terminal, and the like. In addition, the memory 51 may include a high-speed random-access memory, and may further include a non-transitory memory, for example, at least one magnetic disk storage device, a flash storage device, or another non-volatile solid-state storage device. In some examples, the memory 51 may further include a memory remotely disposed relative to the processor 50. The remote memory may be connected to the device via a network. Examples of the foregoing network include but are not limited to the Internet, an intranet, a local area network, a mobile communication network, and a combination thereof.

The input apparatus 52 may be configured to receive entered numbers or character information, and generate key signal input related to a user setting or function control of the device. The output apparatus 53 may include a display device such as a display screen.

Embodiment 6

Embodiment 6 of the present disclosure further provides a non-transitory storage medium including one or more computer-executable instructions. The one or more instructions, when loaded and run by a computer processor, cause the computer processor to perform a method for coding a video, wherein the method includes: setting a long-term reference frame according to attribute information of an image frame; determining a reference index of a to-be-coded image frame based on a normal reference frame and the long-term reference frame; and acquiring a target matching block by performing inter prediction based on the reference index, so as to achieve coding of the to-be-coded image frame.

Certainly, the computer-executable instruction stored in the storage medium provided in this embodiment of the present disclosure is not limited to the foregoing method operation, and may further perform operations related to the method for coding the video provided in any embodiment of the present disclosure.

According to the foregoing descriptions of the embodiments, a person skilled in the art can clearly understand that the present disclosure may be implemented using software and required common hardware, or certainly may be implemented using hardware. Based on such an understanding, the technical solutions of the present disclosure essentially or the part contributing to the prior art of the technical solutions may be implemented in a form of a software product. The computer software product may be stored in a computer-readable storage medium, such as a floppy disk, a read-only memory (ROM), a random-access memory (RAM), a flash, a hard disk, or an optical disc of a computer, and may include several instructions for instructing a computer device (which may be a personal computer, a server, a network device, or the like) to perform the methods in the embodiments of the present disclosure.

It should be noted that, in the foregoing embodiment of the apparatus for coding the video, the plurality of units and modules included are only divided according to functional logic, but are not limited to the above division, other divisions may be adopted as long as corresponding functions can be implemented. In addition, names of the plurality of functional units are merely for the purpose of distinguishing from each other, but are not intended to limit the protection scope of the present disclosure. In addition, the term "and/or" when used in a list of items, refers to the any of the items singly or in combination, unless the context clearly dictates otherwise. For example, "X, Y, and/or Z" refers to "X," "Y," "Z," "X and Y," "X and Z," "Y and Z," or "X, Y, and Z," or any permutation of the foregoing.

What is claimed is:
1. A method for coding a video based on a long-term reference frame, comprising:
    setting a long-term reference frame according to attribute information of an image frame;

determining a reference index of a to-be-coded image frame based on a normal reference frame and the long-term reference frame; and acquiring a target matching block by performing inter prediction based on the reference index, so as to achieve coding of the to-be-coded image frame;

wherein setting the long-term reference frame according to the attribute information of the image frame comprises:

setting the long-term reference frame based on a degree of redundancy in a time domain and a degree of redundancy in a spatial domain of the image frame, the degree of redundancy in the time domain indicating a degree of having a same coding macroblock in the image frame and a neighboring image frame thereof, and the degree of redundancy in the spatial domain indicating a degree of having a same coding macroblock within the image frame.

2. The method according to claim 1, wherein setting the long-term reference frame according to the attribute information of the image frame comprises:

extracting, for each image frame of a plurality of image frames, a frame type in attribute information corresponding to the image frame; and setting an image frame corresponding to the frame type as the long-term reference frame in a case that the frame type is at least one of a key frame or a scenario switching frame.

3. The method according to claim 1, wherein setting the long-term reference frame based on the degree of redundancy in the time domain and the degree of redundancy in the spatial domain of the image frame comprises: acquiring, for each image frame of a plurality of image frames, an inter-frame coding cost and an intra-frame coding cost respectively, wherein the inter-frame coding cost reflects the degree of redundancy in the time domain and the intra-frame coding cost reflects the degree of redundancy in the spatial domain, the degree of redundancy in the time domain being inversely proportional to the inter-frame coding cost and the degree of redundancy in the spatial domain being inversely proportional to the intra-frame coding cost;

determining a current coding cost ratio of a current image frame based on the intra-frame coding cost and the inter-frame coding cost;

acquiring a first coding cost ratio and a second coding cost ratio of first two image frames of the current image frame, and determining a ratio variance of the current coding cost ratio, the first coding cost ratio, and the second coding cost ratio, wherein the first coding cost ratio is a coding cost ratio of a previous image frame of the current image frame, and the second coding cost ratio is a coding cost ratio of an image frame in front of the previous image frame; and setting the current image frame as the long-term reference frame in a case that it is determined that the second coding cost ratio, the first coding cost ratio, and the current coding cost ratio successively decrease, and the ratio variance is less than a threshold value.

4. The method according to claim 1, wherein determining the reference index of the to-be-coded image frame based on the normal reference frame and the long-term reference frame comprises:

determining, based on the normal reference frame and the long-term reference frame and successively according to a first-type prediction mode, a second-type prediction mode, and a third-type prediction mode, a reference index of the to-be-coded image frame corresponding to the first-type prediction mode, a reference index of the to-be-coded image frame corresponding to the second-type prediction mode, and a reference index of the to-be-coded image frame corresponding to the third-type prediction mode, wherein the first-type prediction mode comprises at least one of a MERGE prediction mode or a SKIP prediction mode, the second-type prediction mode comprises at least one of a 2N*2N prediction mode or a BIDIR prediction mode, and the third-type prediction mode comprises at least one of a 2N*N prediction mode, an N*2N prediction mode, a 2N*nD prediction mode, a 2N*nU prediction mode, an nR*2N prediction mode, or an nL*2N prediction mode.

5. The method according to claim 4, wherein determining, based on the normal reference frame and the long-term reference frame and successively according to the first-type prediction mode, the second-type prediction mode, and the third-type prediction mode, the reference index of the to-be-coded image frame corresponding to the first-type prediction mode, the reference index of the to-be-coded image frame corresponding to the second-type prediction mode, and the reference index of the to-be-coded image frame corresponding to the third-type prediction mode comprises:

acquiring a coding macroblock of the to-be-coded image frame according to the first-type prediction mode, and generating a first reference index corresponding to the to-be-coded image frame in the first-type prediction mode by fusing target reference indexes of a left block, an upper left block, an upper block, an upper right block, and a lower left block of the coding macroblock and a target reference index of a reference coding macroblock whose position corresponds to the coding macroblock in the time domain, wherein the reference coding macroblock is located in at least one of the normal reference frame or the long-term reference frame;

performing coding recursion on the coding macroblock of the to-be-coded image frame, determining a parent fusion reference index based on a target reference index of a parent coding block of the coding macroblock, and determining a child fusion reference index based on a target reference index of a child coding block of the coding macroblock;

determining the first reference index, the parent fusion reference index, and the child fusion reference index as a second reference index corresponding to the to-be-coded image frame in the second-type prediction mode; and searching, based on a mode type of the third-type prediction mode, for a third reference index corresponding to the to-be-coded image frame in a predetermined index configuration table.

6. The method according to claim 5, wherein a correspondence relationship between a mode type and the third reference index in the predetermined index configuration table comprises at least one of the following:

in a case that the mode type is the 2N*N prediction mode, an upper index in the third reference index is determined based on a target reference index of a first child coding block and a target reference index of a second child coding block in the coding recursion, and a lower index in the third reference index is determined based on a target reference index of a third child coding block and a target reference index of a fourth child coding block in the coding recursion;

in a case that the mode type is the N*2N prediction mode, a left index in the third reference index is determined based on the target reference index of the first child coding block and the target reference index of the third child coding block in the coding recursion, and a right index in the third reference index is determined based on the target reference index of the second child coding block and the target reference index of the fourth child coding block in the coding recursion;

in a case that the mode type is the 2N*nD prediction mode, the upper index in the third reference index is the second reference index, and the lower index in the third reference index is determined based on the target reference index of the third child coding block and the target reference index of the fourth child coding block in the coding recursion;

in a case that the mode type is the 2N*nU prediction mode, the upper index in the third reference index is determined based on the target reference index of the first child coding block and the target reference index of the second child coding block in the coding recursion, and the lower index in the third reference index is the second reference index;

in a case that the mode type is the nR*2N prediction mode, the left index in the third reference index is the second reference index, and the right index in the third reference index is determined based on the target reference index of the second child coding block and the target reference index of the fourth child coding block in the coding recursion; and in a case that the mode type is the nL*2N prediction mode, the left index in the third reference index is determined based on the target reference index of the first child coding block and the target reference index of the third child coding block in the coding recursion, and the right index in the third reference index is the second reference index, wherein the first child coding block, the second child coding block, the third child coding block, and the fourth child coding block are respectively an upper left child coding block, an upper right child coding block, a lower left child coding block, and a lower right child coding block in four child coding blocks generated by segmenting the coding macroblock during the coding recursion.

7. The method according to claim 1, wherein acquiring the target matching block by performing inter prediction based on the reference index, so as to achieve coding of the to-be-coded image frame comprises:

searching, based on the reference index, for the target matching block in at least one of the normal reference frame or the long-term reference frame; and performing, based on the target matching block, compression coding on the to-be-coded image frame.

8. The method according to claim 7, wherein searching, based on the reference index, for the target matching block in at least one of the normal reference frame or the long-term reference frame comprises:

in a 2N*2N prediction mode, in a case that it is determined that at least one of the normal reference frame or the long-term reference frame is not a target reference frame in a MERGE prediction mode, narrowing down a search range for the target matching block in at least one of the normal reference frame or the long-term reference frame.

9. The method according to claim 7, wherein searching, based on the reference index, for the target matching block in at least one of the normal reference frame or the long-term reference frame comprises:

searching, based on a diamond search algorithm, for the target matching block in at least one of the normal reference frame or the long-term reference frame in a case that the attribute information of the to-be-coded image frame comprises B-frame information and non-key frame information.

10. A computer device for coding a video based on a long-term reference frame, comprising:
one or more processors; and
a memory, configured to store one or more programs, wherein
the one or more programs, when loaded and run by the one or more processors, cause the one or more processors to perform:
setting a long-term reference frame according to attribute information of an image frame;
determining a reference index of a to-be-coded image frame based on a normal reference frame and the long-term reference frame; and
acquiring a target matching block by performing inter prediction based on the reference index, so as to achieve coding of the to-be-coded image frame;
wherein setting the long-term reference frame according to the attribute information of the image frame comprises:
setting the long-term reference frame based on a degree of redundancy in a time domain and a degree of redundancy in a spatial domain of the image frame, the degree of redundancy in the time domain indicating a degree of having a same coding macroblock in the image frame and a neighboring image frame thereof, and the degree of redundancy in the spatial domain indicating a degree of having a same coding macroblock within the image frame.

11. A non-transitory computer-readable storage medium, storing one or more computer programs, wherein the one or more computer programs, when loaded and run by a processor of a computer device, cause the computer device to perform:
setting a long-term reference frame according to attribute information of an image frame;
determining a reference index of a to-be-coded image frame based on a normal reference frame and the long-term reference frame; and
acquiring a target matching block by performing inter prediction based on the reference index, so as to achieve coding of the to-be-coded image frame;
wherein setting the long-term reference frame according to the attribute information of the image frame comprises:
setting the long-term reference frame based on a degree of redundancy in a time domain and a degree of redundancy in a spatial domain of the image frame, the degree of redundancy in the time domain indicating a degree of having a same coding macroblock in the image frame and a neighboring image frame thereof, and the degree of redundancy in the spatial domain indicating a degree of having a same coding macroblock within the image frame.

12. The computer device according to claim 10, wherein the one or more programs, when loaded and run by the one or more processors, cause the one or more processors to perform:

extracting, for each image frame of a plurality of image frames, a frame type in attribute information corresponding to the image frame; and setting an image frame corresponding to the frame type as the long-term reference frame in a case that the frame type is at least one of a key frame or a scenario switching frame.

13. The computer device according to claim 10, wherein the one or more programs, when loaded and run by the one or more processors, cause the one or more processors to perform:

acquiring, for each image frame of a plurality of image frames, an inter-frame coding cost and an intra-frame coding cost respectively, wherein the inter-frame coding cost reflects the degree of redundancy in the time domain and the intra-frame coding cost reflects the degree of redundancy in the spatial domain, the degree of redundancy in the time domain being inversely proportional to the inter-frame coding cost and the degree of redundancy in the spatial domain being inversely proportional to the intra-frame coding cost;

determining a current coding cost ratio of a current image frame based on the intra-frame coding cost and the inter-frame coding cost;

acquiring a first coding cost ratio and a second coding cost ratio of first two image frames of the current image frame, and determining a ratio variance of the current coding cost ratio, the first coding cost ratio, and the second coding cost ratio, wherein the first coding cost ratio is a coding cost ratio of a previous image frame of the current image frame, and the second coding cost ratio is a coding cost ratio of an image frame in front of the previous image frame; and setting the current image frame as the long-term reference frame in a case that it is determined that the second coding cost ratio, the first coding cost ratio, and the current coding cost ratio successively decrease, and the ratio variance is less than a threshold value.

14. The computer device according to claim 10, wherein the one or more programs, when loaded and run by the one or more processors, cause the one or more processors to perform:

determining, based on the normal reference frame and the long-term reference frame and successively according to a first-type prediction mode, a second-type prediction mode, and a third-type prediction mode, a reference index of the to-be-coded image frame corresponding to the first-type prediction mode, a reference index of the to-be-coded image frame corresponding to the second-type prediction mode, and a reference index of the to-be-coded image frame corresponding to the third-type prediction mode, wherein the first-type prediction mode comprises at least one of a MERGE prediction mode or a SKIP prediction mode, the second-type prediction mode comprises at least one of a 2N*2N prediction mode or a BIDIR prediction mode, and the third-type prediction mode comprises at least one of a 2N*N prediction mode, an N*2N prediction mode, a 2N*nD prediction mode, a 2N*nU prediction mode, an nR*2N prediction mode, or an nL*2N prediction mode.

15. The computer device according to claim 14, wherein the one or more programs, when loaded and run by the one or more processors, cause the one or more processors to perform:

acquiring a coding macroblock of the to-be-coded image frame according to the first-type prediction mode, and generating a first reference index corresponding to the to-be-coded image frame in the first-type prediction mode by fusing target reference indexes of a left block, an upper left block, an upper block, an upper right block, and a lower left block of the coding macroblock and a target reference index of a reference coding macroblock whose position corresponds to the coding macroblock in the time domain, wherein the reference coding macroblock is located in at least one of the normal reference frame or the long-term reference frame;

performing coding recursion on the coding macroblock of the to-be-coded image frame, determining a parent fusion reference index based on a target reference index of a parent coding block of the coding macroblock, and determining a child fusion reference index based on a target reference index of a child coding block of the coding macroblock;

determining the first reference index, the parent fusion reference index, and the child fusion reference index as a second reference index corresponding to the to-be-coded image frame in the second-type prediction mode; and searching, based on a mode type of the third-type prediction mode, for a third reference index corresponding to the to-be-coded image frame in a predetermined index configuration table.

16. The computer device according to claim 15, wherein a correspondence relationship between a mode type and the third reference index in the predetermined index configuration table comprises at least one of the following:

in a case that the mode type is the 2N*N prediction mode, an upper index in the third reference index is determined based on a target reference index of a first child coding block and a target reference index of a second child coding block in the coding recursion, and a lower index in the third reference index is determined based on a target reference index of a third child coding block and a target reference index of a fourth child coding block in the coding recursion;

in a case that the mode type is the N*2N prediction mode, a left index in the third reference index is determined based on the target reference index of the first child coding block and the target reference index of the third child coding block in the coding recursion, and a right index in the third reference index is determined based on the target reference index of the second child coding block and the target reference index of the fourth child coding block in the coding recursion;

in a case that the mode type is the 2N*nD prediction mode, the upper index in the third reference index is the second reference index, and the lower index in the third reference index is determined based on the target reference index of the third child coding block and the target reference index of the fourth child coding block in the coding recursion;

in a case that the mode type is the 2N*nU prediction mode, the upper index in the third reference index is determined based on the target reference index of the first child coding block and the target reference index of the second child coding block in the coding recursion, and the lower index in the third reference index is the second reference index;

in a case that the mode type is the nR*2N prediction mode, the left index in the third reference index is the second reference index, and the right index in the third reference index is determined based on the target reference index of the second child coding block and the target reference index of the fourth child coding block in the coding recursion; and in a case that the mode type is the nL*2N prediction mode, the left index in the third reference index is determined based on the target reference index of the first child coding block and the target reference index of the third child coding block in the coding recursion, and the right index in the third reference index is the second reference index, wherein the first child coding block, the second child coding block, the third child coding block, and the fourth child coding block are respectively an upper left child coding block, an upper right child coding block, a lower left child coding block, and a lower right child coding block in four child coding blocks generated by segmenting the coding macroblock during the coding recursion.

17. The computer device according to claim 10, wherein the one or more programs, when loaded and run by the one or more processors, cause the one or more processors to perform:

searching, based on the reference index, for the target matching block in at least one of the normal reference frame or the long-term reference frame; and performing, based on the target matching block, compression coding on the to-be-coded image frame.

18. The computer device according to claim 17, wherein the one or more programs, when loaded and run by the one or more processors, cause the one or more processors to perform:

in a 2N*2N prediction mode, in a case that it is determined that at least one of the normal reference frame or the long-term reference frame is not a target reference frame in a MERGE prediction mode, narrowing down a search range for the target matching block in at least one of the normal reference frame or the long-term reference frame.

19. The computer device according to claim 17, wherein the one or more programs, when loaded and run by the one or more processors, cause the one or more processors to perform:

searching, based on a diamond search algorithm, for the target matching block in at least one of the normal reference frame or the long-term reference frame in a case that the attribute information of the to-be-coded image frame comprises B-frame information and non-key frame information.

20. The non-transitory computer-readable storage medium according to claim 13, wherein the one or more computer programs, when loaded and run by a processor of a computer device, cause the computer device to perform:

extracting, for each image frame of a plurality of image frames, a frame type in attribute information corresponding to the image frame; and setting an image frame corresponding to the frame type as the long-term reference frame in a case that the frame type is at least one of a key frame or a scenario switching frame.

* * * * *